United States Patent [19]

Ward

[11] 3,915,923

[45] Oct. 28, 1975

[54] SOLUTION PROCESS FOR MAKING POLYURETHANE

[75] Inventor: Robert J. Ward, Somerville, N.J.

[73] Assignee: Union Carbide Corporation, New York, N.Y.

[22] Filed: Oct. 26, 1970

[21] Appl. No.: 84,166

[52] U.S. Cl.. 260/32.6; 260/77.5 AN; 260/77.5 AA
[51] Int. Cl.²...C08K 5/20; C08G 18/10; C08G 18/28
[58] Field of Search...... 260/77.5 AN, 77.5 AM, 260/75 TN, 32.6 N, 75 NE, 77.5 AA, 77.5 SP

[56] References Cited

UNITED STATES PATENTS

| 3,373,143 | 3/1968 | Chilvers et al. | 260/75 |
|---|---|---|---|
| 3,377,308 | 4/1968 | Oertel et al. | 260/32.6 |
| 3,428,611 | 2/1969 | Brotherton | 260/75 |
| 3,494,894 | 2/1970 | Urgesi | 260/75 |
| 3,503,934 | 3/1970 | Chilvers | 260/75 |
| 3,509,102 | 4/1970 | Horn et al. | 260/77.5 |

Primary Examiner—H. S. Cockeram
Attorney, Agent, or Firm—G. A. Skoler

[57] ABSTRACT

Multistep solution process for making high molecular weight, thermoplastic polycaprolactone polyurethane which involves (1) making an isocyanate end-blocked polycaprolactone, (2) chain extending with a stoichiometric excess of a diol, and (3) incrementally reacting diisocyanate with the product of (2) until the desired viscosity is reached. The product is an excellent coating vehicle and adhesive.

5 Claims, No Drawings

SOLUTION PROCESS FOR MAKING POLYURETHANE

This invention relates to a convenient method for making an essentially linear, high molecular weight, thermoplastic polyesterpolyurethane in solution. More particularly, this invention relates to the manufacture of a polycaprolactone polyesterpolyurethane solution having a reduced viscosity of at least 0.2, preferably at least 0.4, based on 2 grams of the polyesterpolyurethane in 100 milliliters of dimethylformamide, determined at 25°C.

Heretofore, high molecular weight, thermoplastic polyesterpolyurethanes have been made predominantly in the absence of solvents. Attempts to make such in solution have resulted in a number of problems, such as premature gelation, inability to reach high molecular weights, complicated processing conditions, solution instability, and the like. A specific problem occurs in the case of polyesterpolyurethanes based upon polyester made from dicarboxylic acids and diols. Such polyesters possess a distribution of molecules which vary in molecular weight and which possess both hydroxyl and carboxyl chain terminating groups. Of course, when such polyesters are to be reacted with polyisocyanates, the manufacturer employs a stoichiometric excess of the diol for the purpose of providing hydroxyl chain termination rather than carboxyl chain termination. However, under the best conditions, not all of the molecules are hydroxyl terminated and there exists an undesirable amount of carboxyl termination. Such termination introduces other reactive species into the polyurethane structure which, it is believed, creates the difficulties in producing the high molecular weight products free of deleterious pendent components. For example, it is known that carboxyl groups are at least about 18 times less reactive with isocyanates than alcoholic hydroxyl groups. Thus, it follows that a polyester molecule with free carboxyl termination must react significantly slower with a polyisocyanate than does the polyester molecules which contain hydroxyl termination. By the time the carboxyl terminated molecules do react, the molecular weight of the other molecules, as a result of reaction with isocyanate, would have grown appreciably. If the isocyanate addition provides for —NCO termination, thus producing a prepolymer, the finally reacting carboxyl terminated molecule is of short length and capable of being reacted into the back-bone of the longer polymeric molecules, thus increasing branching and/or cross-linking. Moreover, many solvents are hydroscopic and water favorably competes with the free carboxyl groups for free isocyanate, thus further repressing those carboxyl terminated molecules from participating in polymer growth. To eliminate this situation from occurring, higher reaction temperatures are needed and such induces cross-linking and branching of such molecules in higher polymeric back-bones.

There is described herein a solution process for producing high molecular weight, thermoplastic polyesterpolyurethanes which is reproducable and convenient. It involves the following steps:

A. reacting a dihydroxyl terminated polycaprolactone diol with a stoichiometric excess of an organic diisocyanate to produce a prepolymer containing —NCO chain terminating groups;

B. reacting an amount of the prepolymer of (A) with a stoichiometric excess of an organic diol to produce a second stage prepolymer containing free hydroxyl groups; and, C. incrementally adding more diisocyanates to the second stage prepolymer until the desired viscosity is reached.

If the reaction in (B) results in a second stage prepolymer containing free —NCO, then it may be necessary to add more organic diol to achieve hydroxyl termination.

The reaction may be carried out at temperatures as low as about 35°C. to as high as about 140°C., though the preferred temperature range is between about 45°C. to about 90°C.

The process may be carried out in the absence of any catalyst. In such catalyst free processes it is usually necessary to employ longer reaction times and higher temperatures (generally at least 80°C.). If it is desired to avoid such conditions then one may add to the process one of the usual urethane catalysts which enhance the addition reaction between isocyanates and hydroxyl compounds. Suitable catalysts for enhancing the rate of the reaction at stages (A), (B) and (C), as described above, may be any one or more of the following catalysts:

a. Tertiary amines such as
   trimethylamine,
   triethylamine,
   N-methylmorpholine,
   N-ethylmorpholine,
   N,N-dimethylbenzylamine,
   N,N-dimethylethanolamine,
   N,N,N',N'-tetramethyl-1,3-butanediamine,
   triethanolamine,
   1,4-diazabicyclo[2.2.2]octane,
   1,2,4-trimethylolpiperazine,
   bis(dimethylaminomethyl)amine,
   N,N,N',N'-tetraalkyl-1,3-propanediamine,
   bis[2-(N,N-dimethylamino)ethyl]ether, and the like;

b. Tertiary phosphines such as trialkylphosphines, dialkylbenzylphosphines, and the like;

c. Strong bases such as alkali and alkaline earth metal hydroxides, alkoxides, and phenoxides;

d. Acidic metal salts of strong acids such as ferric chloride, stannic chloride, stannous chloride, antimony trichloride, bismuth nitrate and chloride, and the like;

e. Chelates of various metals such as those which can be obtained from acetylacetone, benzoylacetone trifluoroacetylacetone, ethyl acetoacetate, salicylaldehyde, cyclopentanone-2-carboxylate, acetylacetoneimine, bis-acetylacetonealkylenediimines, salicylaldeheimine, and the like, with various metals such as Be, Mg, Zn, Cd, Pb, Ti, Zr, Sn, As, Bi, Cr, Mo, Mn, Fe, Co, Ni, or such ions as $MoO_2^{++}$, $UO_2^{++}$, and the like;

f. Alcoholates and phenolates of various metals such as $Ti(OR)_4$, $Sn(OR)_4$, $Sn(OR)_2$, $Al(OR)_3$, and the like, wherein R is alkyl or aryl, and the reaction products of alcoholates with carboxylic acids, beta-diketones, and 2-(N,N-dialkylamino)alkanols, such as the well known chelates of titanium obtained by said or equivalent procedures;

g. Salts of organic acids with a variety of metals such as alkali metals, alkaline earth metals, Al, Sn, Pb, Sb, Mn, Co, Ni, and Cu, including, for example sodium acetate, potassium laurate, calcium hexanoate, stannous acetate, stannous octoate, stannous oleate, lead octoate, metallic driers such as manganese and cobalt naphthenate and the like;

h. Organometallic derivatives of tetravalent tin, trivalent and pentavalent As, Sb, and Bi, and metal carbonyls of iron and cobalt. Among the organotin compounds that deserve particular mention are dialkyltin salts of carboxylic acids, e.g., dibutyltin diacetate, dibutyltin, dilaurate, dibutyltin maleate, dilauryltin diacetate, dioctyltin, diacetate, dibutyltin-bis(4-methylaminobenzoate), dibutyltin-bis(6-methylaminocaproate), and the like. Similarly there may be used a trialkyltin hydroxide, dialkyltin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis(isopropoxide), dibutyltin-bis(2-dimethylaminopentylate), dibutyltin dichloride, dioctyltin dichloride, and the like.

The amount of catalyst, when it is employed, may range, with respect to each of the steps (A) through (C), from about 0.001 to about 1000 parts per million of catalyst, based on the weight of the reactants employed. In the preferred operation of the process, the amount of catalyst employed is typically between about 100 to 500 parts per million, based on the weight of the reactants employed. The reaction should be carried out under an inert atmosphere such as nitrogen, argon, helium, carbon dioxide, methane, and the like. In addition, each of the steps or stages of the reaction should be carried out under agitation so as to effect the best possible reactant distribution.

As mentioned previously, this process is a solution process. This means that all of the reactants are provided in the liquid stage by dissolving each in a solvent. The process is a homogeneous phase process insofar as there are no multiple phases during the practice thereof. In order to effectuate such a homogeneous phase reaction it is necessary to employ a solvent system in which all of the reactants are compatible. Typically, the solvent of choice is a polar solvent. Such polar solvents include those which possess carbonyl groups, such as contained in ketones, amides and esters, ether groups, sulfoxide groups, and the like. It is important that the solvent be as free as possible of radicals thereon which possess active hydrogen which are capable of reaction with isocyanate.

Illustrative polar solvents include, by way of example, ketone solvents such as dimethyl ketone, methylethyl ketone, methylisopropyl ketone, methyl-n-propyl ketone, methylisopropyl ketone, methyl-n-butyl ketone, methylisobutyl ketone, and the like; ester solvents such as methyl acetate, ethyl acetate, n-propyl acetate, n-butyl acetate, isobutyl acetate, n-hexyl acetate, ethyl propionate, and the like; sulfoxide solvents such as dimethyl sulfoxide, diethyl sulfoxide, methylethyl sulfoxide, di-n-butyl sulfoxide, and the like; ether solvents such as diethyl ether, di-n-propyl ether, di-n-butyl ether, di-n-hexyl ether, dioxane-1,4,tetrahydrofuran, dimethyl ether of ethylene glycol, diethyl ether of ethylene glycol, methylethyl ether of ethylene glycol, dimethyl ether of diethylene glycol, diethyl ether of diethylene glycol, dimethyl ether of triethylene glycol, diethyl ether of triethylene glycol, and the dialkyl (1 to 3 carbon atoms) polyethylene ether glycols having higher molecular weights up to about 450, and the like; amide solvents such as N,N-dimethyl formamide, N,N-dimethyl acetamide, N,N-dimethyl propionamide, and the like; as well as the other well-known polar solvents such as those which contain phosphorus oxide, sulfone, and the like groups therein.

The polyester polyurethanes manufactured by the solution process of this invention comprise the reaction product of an organic diisocyanate with a polycaprolactone diol. The polycaprolactone diols are unique for the solution process of this invention principally because they do not contain any free carboxyl groups and provide an exact amount of hydroxyl groups, that is, two alcoholic hydroxyl groups per molecule. They are formed by the reaction of caprolactone with a diol initiator. The methods employed for manufacturing such polycaprolactone diols can be found in U.S. Pat. No. 3,169,945, patented Feb. 16, 1965.

The caprolactone usable in the practice of this invention to make the polycaprolactone diol are those of the formula

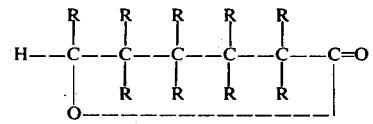

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve.

Diols that are suitable as bifunctional initiators for reaction with the caprolactones of the above formula include glycols of the formula $HO(CH_2)_nOH$ in which $n$ equals 2 to 10, glycols of the formulae $HO(CH_2CH_2O)_nH$ and $HO[CH(CH_3)CH_2O]_nH$ in which $n$ equals 2 to 40, such as ethylene glycol, diethylene glycol, and the like, 2,2-dimethyl-1,3-propanediol, 2,2-diethyl-1,3-propanediol, 3-methyl-1,5-pentanediol, N-methyl and N-ethyl diethanolamines, various cyclohexanediols,

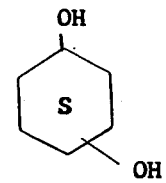

4,4'-methylenebiscyclohexanol,

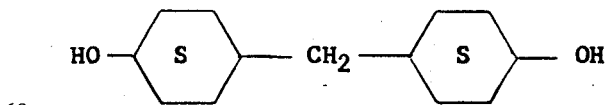

4,4'-isopropylidenebiscyclohexanol,

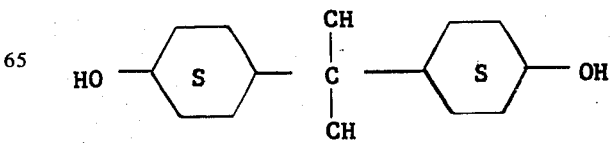

various xylenediols,

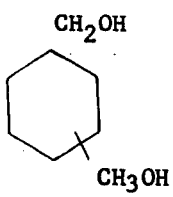

various hydroxyethyl benzyl alcohols,

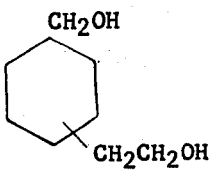

various hydroxymethyl-phenylpropanols,

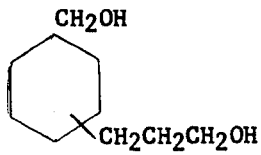

various phenylenediethanols,

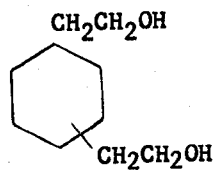

various phenylenedipropanols,

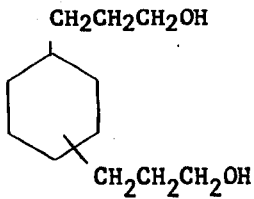

and various heterocyclic diols such as 1,4-piperazinediethanol.

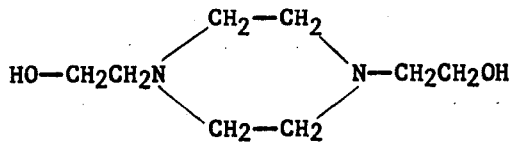

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamide, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorous acid; aliphatic, aromatic, and cycloaliphatic primary monoamines like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxyalkylated derivatives suitable for the purposes of the invention is illustrated by the reaction of 1,4-butanediol with ethylene oxide:

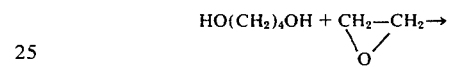

$$H(OCH_3CH_2)_xO(CH_2)_4O(CH_2CH_2O)H$$

where $x + y = 1$ to 40.

The polycaprolactone diol formed from the aforementioned reactants typically have a molecular weight in excess of 500, and are usually not greater than about 15,000. The preferred polycaprolactone diols employable in the practice of this invention to provide excellent coatings and adhesives are those which have a molecular weight from about 550 to about 7000.

The diisocyanates used in the practice of this invention are represented by the general formula:

$$R'(NCO)_2$$

wherein R' is a divalent substituted or unsubstituted organic hydrocarbon radical. Especially preferred polyisocyanates are those in which R' is a divalent organic hydrocarbon radical selected from the group consisting of alkylene, substituted alkylene, arylene and substituted arylene radicals.

Representative examples of the preferred and especially preferred polyisocyanates are tolylene diisocyanate, hexamethylene diisocyanate, xylene diisocyanate, chlorophenylene diisocyanate, diphenylmethane-4,4'-diisocyanate, naphthalene-1,5-diisocyanate, 3,3'-dimethyl-4,4'-biphenylene diisocyanate, 3,3'-dimethoxy-4,4'-biphenylene diisocyanate, 2,2', 5,5'-tetramethyl-4,4'-biphenylene diisocyanate, 4,4'-methylenebis (phenylisocyanate), 4,4'-sulfonylbis (phenylisocyanate), 4,4'-methylene di-ortho-tolylisocyanate, ethylene diisocyanate, trimethylenediisocyanate and the like. Mixtures of any one or more of the above mentioned organic isothiocyanates or isocyanates may be used as desired.

The organic diols employed in step (B), above, may be the aforementioned polycaprolactone diols or other diols such as those depicted above as suitable bifunctional initiators for reaction with caprolactone. Preferred diols are the polycaprolactone diols and the alkylene glycols, such as ethylene glycol, 1,3-propylene glycol and 1,4-butylene glycol, and the like.

The amount of solvent employed in steps A, B and C, described above, is not narrowly critical and is dependent upon the amount of solvent necessary to provide a comfortable viscosity for thorough admixture of the reactants undergoing reaction during each step. For example, if the solvent employed is not as effective as other solvents for the dilution of the reactants and the resulting polymer, in all probability it will be necessary to excessively dilute the reactants with such solvent in order to obtain good stirring conditions during each of the reaction steps. However, if the solvent is an aggressive solvent for the reactants and the resulting polymers, then the solids content of the solution can be very high. Generally the solids content of the solution during the reaction does not exceed about 75 weight % of the total mixture, preferably not more than about 50 weight percent of the total mixture. As a rule it is not desirable to keep the solids content of the reactants in the mixture below about 5 weight %. The choice of solvent, whether or not a non-polar diluent is added, will greatly determine the amount of solvent which is employed and the characteristics of the resulting solution with respect to viscosity.

As indicated above, the solution polymerization technique of this invention can also carry a non-polar solvent which acts as a diluent. Such diluents are employed in relatively small quantities, seldom exceeding 50 weight % of the solvent which is employed, typically not exceeding about 25 weight % of the solvent employed. They include the usual hydrocarbon solvents such as n-hexane, n-nonane, n-dodecane, xylene, toluene, mineral spirits, and the like type of solvents.

In carrying out the various steps (A), (B) and (C), the ratio of the reactants can be varied significantly without sacrificing the utility of the resulting polymers as adhesives and coatings. In step (A), as long as more than one mole of diisocyanate for each mole of polycaprolactone diol is employed, the desired prepolymer is obtainable. However, in most cases, a diisocyanate to diol mole ratio of not greater than about 2 to 1 is used and a mole ratio of not less than 1.1 to 1 is preferred.

In step (B), the mole ratio of diol to prepolymer is usually less than 2 to 1, and most frequently, it is slightly greater than 1 to 1. In step (C), usually not more than a slight mole excess of diisocyanate is added. However, the addition is effective in fractional parts of the diisocyanate, and each fraction added is completely reacted before the next fraction is added. Thus it is possible to gently creep up to the desired viscosity and avoid gellation and other problems.

Step (C) provides numerous advantages. The addition of diisocyanate in step (C) offers an opportunity to correct the molecular weight and bring it to the desired level. If steps (A) and (B) contain excessive water, step (C) makes certain that all the free hydroxyl groups are reacted with isocyanate thus achieving the maximum molecular weight without loss of thermoplasticity.

The solution of polyester polyurethanes of this invention can be employed as such as adhesives or coatings. They are extremely effective for bonding such materials as wood to metal, wood to wood, plastics to plastic, and the like. They are also excellent coatings for wood, metal, plastics, and the like. They exhibit excellent adhesive characteristics in that they adhere very tenaciously to the surface or surfaces to which they are applied. Their characteristics of course are exhibited once the solvent has been evaporated.

To more specifically describe this invention, reference is made to the following examples. These examples are offered simply to show most favorable modes for carrying out this invention and they are not intended to limit the scope of this invention.

EXAMPLE 1

To a flask equipped with a thermometer, stirrer, reflux condenser, feed tank, nitrogen purge and heating mantle were added 327.46 grams (0.333 OH eq.) of a 1968 molecular weight diethylene glycol initiated epsiloncaprolactone diol and 320 grams of 2-butanone. The mixture was heated to 55°C. and 83.33 grams (0.667 eq.) of molten p,p'-diphenylmethane diisocyanate were weighed into the feed tank and fed slowly into the flask while maintaining the temperature at 60°C. After the addition was completed, the temperature was held at 60°C. for 1 hour at which time 0.0412 gram of dibutyltin dilaurate was added to the flask.

After 40 minutes has passed, 15.0 grams (0.333 OH eq.) of anhydrous 1,4-butanediol were added slowly to the flask while maintaining the reaction temperature. This addition was followed immediately with 0.0412 gram of dibutyltin dilaurate. The temperature was maintained at 60°C. for 30 minutes, at which time a colormetric test was taken to determine the presence of free isocyanate. The test showed a level of isocyanate below 100 ppm (parts per million), therefore, 2 grams of p,p'-diphenylmethane diisocyanate were added to the flask. Within 20 minutes the viscosity increased to the point where it was necessary to add more 2-butanone (128 grams) and N,N-dimethylformamide (192 grams) to the flask. In the same manner, three one gram increments of the diisocyanate were added to the flask until a solution viscosity at 60°C. of 38,000 centipoises was obtained. At this point the resin reaction product was discharged.

The resin had a reduced viscosity of 0.82 at 25°C. and possessed excellent adhesion to vinyl chloride polymer and urethane polymer coated substrates.

EXAMPLE 2

In this example, there is described an in situ three step process where the unreacted polycaprolactone diol acts as the chain extender and its existence after initial reaction with the diisocyanate constitutes step (B) of the process.

To a flask equipped with a thermometer, stirrer, reflux condenser, feed tank, nitrogen purge and heating mantle were added 216.0 grams (0.350 OH eq.) of a 1232 molecular weight diethylene glycol initiated epsiloncaprolactone diol and 195 grams of 2-butanone. The mixture was heated to 60°C. and 43.75 grams (0.350 eq.) of p,p'-diphenylmethane diisocyanate were added slowly through the feed tank while maintaining the reaction temperature at 60°C. The temperature was maintained at 60°C. for 2¼ hours at which time a colorometric test was taken to determine the presence of free —NCO. The test showed over 100 ppm of free isocyanate present. The reaction was cooled and blanketed with a nitrogen purge overnight. Sixteen hours later the reactants were again heated to 60°C. After 2 hours at 60°C. the level of free isocyanate was still high. At this point, 0.068 gram of dibutyltin dilaurate was added to the flask. Thirty minutes later 117 grams of 2-butanone and 78 grams of N,N-dimethylformamide were added to the flask. The mixture was maintained at 60°C. for another 30 minutes at which time the free isocyanate was essentially consumed in the reaction and 2 grams of p,p'-diphenylmethane diisocyanate were added to the flask. This addition was repeated 30 minutes later and 30 minutes thereafter the resin was discharged.

The resin had a reduced viscosity at 25°C. of 0.842 and showed excellent adhesion to a variety of substrates. Peel strength values of 50 lbs/in. on a cotton canvas and 13 lbs/in. on plasticized vinyl chloride film were obtained with this resin.

EXAMPLE 3

To a flask equipped with a thermometer, stirrer, reflux condenser, feed tank, nitrogen purge and heating mantle were added 39.6 grams (0.455 eq.) of toluene diisocyanate and 430 grams of dry 2-butanone. The mixture was heated to 56°C. and 235 grams (0.233 OH eq.) of a 2016 molecular weight diethylene glycol initiated epsilon-caprolactone diol at 60°C. were added to the feed tank and fed slowly into the flask while maintaining a reaction temperature of 60°C. At the completion of the addition, 0.0285 gram of dibutyltin dilaurate was added to the flask and the reaction temperature was maintained at 60°C. for 30 minutes.

Then 10.5 grams (0.233 OH eq.) of 1,4-butanediol were added to the flask followed by another catalyst addition of 0.0285 gram of dibutyltin dilaurate. The temperature was held at 60°C. for another 30 minutes at which time 0.0775 gram of dibutyltin dilaurate was added. The temperature was maintained at 60°C. for another 30 minutes at which time a colorometric test for the presence of free isocyanate indicated the level to be below 100 ppm. One gram of toluene diisocyanate was added to the flask. Thirty minutes later this procedure was repeated and after an additional 30 minutes at 60°C. the resin was discharged.

The resultant resin had a reduced viscosity of 0.91 and a Brookfield viscosity (No. 7 spindle at 50 rpm., at 25°C.) of 67,000 centipoise. The resin exhibited excellent adhesion to cotton canvas (57 lbs/in. peel strength) and to plasticized vinyl chloride film (22 lbs/in. peel strength).

The toluene diisocyanate in the above example was the conventional 80:20 isomeric mixture of 2,4- and 2,6-toluene diisocyanate.

What is claimed is:

1. The solution process for manufacturing a thermoplastic, high molecular weight poly-epsilon-caprolactone polyester polyurethane, which comprises the steps of:

A. reacting a dihydroxyl terminated polycaprolactone with a stoichiometric excess of an organic diisocyanate to produce a prepolymer containing —NCO chain terminating groups;

B. reacting an amount of the prepolymer of (A) with a stoichiometric excess of an organic diol to produce a second stage prepolymer containing free hydroxyl groups; and C. incrementally adding more organic diisocyanate to the second stage prepolymer of (B) until a polymer is produced having a reduced viscosity determined from 2 grams of the polymer dissolved in 100 milliliters of N,N-dimethylformamide of at least about 0.2;

said steps (A), (B) and (C) being carried out as a liquid homogeneous phase mixture in a polar solvent for the reactants and resulting polymer and at a temperature of about 35°C. to about 140°C.

2. The process of claim 1 wherein the dihydroxyl terminated polycaprolactone is formed by reaction of epsilon-caprolactone with diethylene glycol and has a molecular weight of from about 500 to about 15,000.

3. The process of claim 2 wherein the diisocyanate is toluene diisocyanate.

4. The process of claim 2 wherein the diisocyanate is p,p'-diphenylmethane diisocyanate.

5. The process of claim 2 wherein the reduced viscosity of the polymer is at least 0.4.

* * * * *

UNITED STATES PATENT OFFICE
CERTIFICATE OF CORRECTION

Patent No. 3,915,923                    Dated October 28, 1975

Inventor(s) Robert J. Ward

It is certified that error appears in the above-identified patent and that said Letters Patent are hereby corrected as shown below:

Column 1, line 62, "reproducable" should read, --reproducible--.

Column 4, formula at line 25,

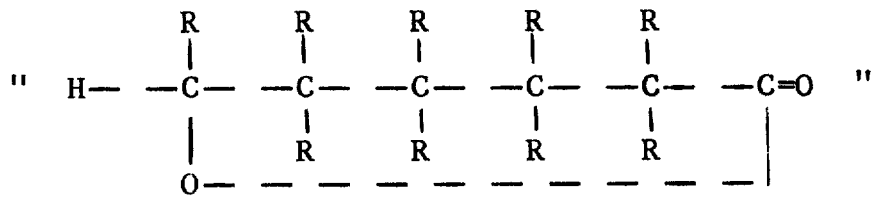

should read,

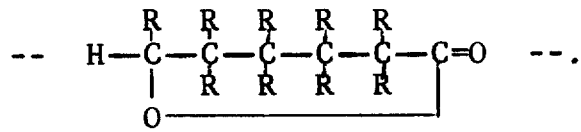

Column 7, line 51, "gellation" should read, --gelation--.

Column 8, line 59, "2 1/4" should read -- 2 1/2 --.

Signed and Sealed this second Day of March 1976

[SEAL]

Attest:

RUTH C. MASON
Attesting Officer

C. MARSHALL DANN
Commissioner of Patents and Trademarks